(12) United States Patent
Scott et al.

(10) Patent No.: US 9,020,952 B2
(45) Date of Patent: Apr. 28, 2015

(54) METHODS AND SYSTEMS FOR PROVIDING UNIQUE SIGNATURES

(75) Inventors: Tony Scott, Sunnyvale, CA (US); Michael Benjamin Selkowe Fertik, Palo Alto, CA (US); Thomas Gerardo Dignan, Mountain View, CA (US)

(73) Assignee: Reputation.com, Inc., Redwood City, CA (US)

( * ) Notice: Subject to any disclaimer, the term of this patent is extended or adjusted under 35 U.S.C. 154(b) by 404 days.

(21) Appl. No.: 13/252,697

(22) Filed: Oct. 4, 2011

(65) Prior Publication Data

US 2013/0086075 A1 Apr. 4, 2013

(51) Int. Cl.
*G06F 7/00* (2006.01)
*G06F 17/30* (2006.01)

(52) U.S. Cl.
CPC .............................. *G06F 17/30979* (2013.01)

(58) Field of Classification Search
CPC ..... G06F 17/3097; G06F 17/16; G06F 17/17; G06F 17/175
USPC ........................................................ 707/747
See application file for complete search history.

(56) References Cited

U.S. PATENT DOCUMENTS

| | | | | |
|---|---|---|---|---|
| 5,442,707 | A | * | 8/1995 | Miyaji et al. .................... 380/30 |
| 2002/0071438 | A1 | * | 6/2002 | Singh .............................. 370/398 |
| 2003/0033275 | A1 | * | 2/2003 | Alpha et al. ....................... 707/1 |
| 2006/0095521 | A1 | * | 5/2006 | Patinkin ......................... 709/206 |

* cited by examiner

*Primary Examiner* — Tony Mahmoudi
*Assistant Examiner* — Michael Le
(74) *Attorney, Agent, or Firm* — Finnegan, Henderson, Farabow, Garrett & Dunner, LLP

(57) ABSTRACT

Presented are systems and methods for creating a set of signatures including acquiring a data set and converting the data set into a plurality of data matrices. The system determines a prime number and determines a plurality of primitive roots to the prime number. The system calculates a template matrix using a first and second primitive root, of the plurality of primitive roots, and selects a data matrix property of interest. The system calculates a first hash function for each of the data matrices to create a first signature for each data matrix such that a main set of signatures is formed, wherein the first hash function is calculated using said property of interest, the prime number, and the template matrix. The system generates a main set of signatures based on the first hash functions, wherein the main set of signatures comprises a first signature for each data matrix.

24 Claims, 6 Drawing Sheets

METHODS AND SYSTEMS FOR PROVIDING UNIQUE SIGNATURES

DESCRIPTION OF THE RELATED ART

The term "hashing" or (signatures) refers to a process wherein one computes a signature of a property, such that when the property stays the same, the signatures are equal and when the property changes, the signatures are "likely" to change (subject to a probabilistic principle). Hashing functions are related to (and often confused with) checksums, check digits, fingerprints, randomization functions, error correcting codes, and cryptographic hash functions. Although standard hashing functions for these various purposes do exist, they generally do not measure a particular property of a matrix or dimensional array, as opposed to merely getting a hash number of an input matrix or object.

Additionally, current hashing techniques operating on matrices to measure a particular property of the matrix (e.g., sparseness) often involve a processor and memory-intensive matrix algebra. For example, to measure sparseness with standard hashing techniques, a sparseness structure is created and a hash value of this sparseness structure is then obtained. But the creation of the sparseness structure often requires more processing overhead than the hashing operation itself.

BRIEF DESCRIPTION OF THE DRAWINGS

The accompanying drawings, which are incorporated in and constitute a part of this specification, illustrate various embodiments. In the drawings.

DESCRIPTION OF THE EMBODIMENTS

Reference will now be made in detail to the present exemplary embodiments illustrated in the accompanying drawings. Wherever possible, the same reference numbers will be used throughout the drawings to refer to the same or like parts.

Figure 1:
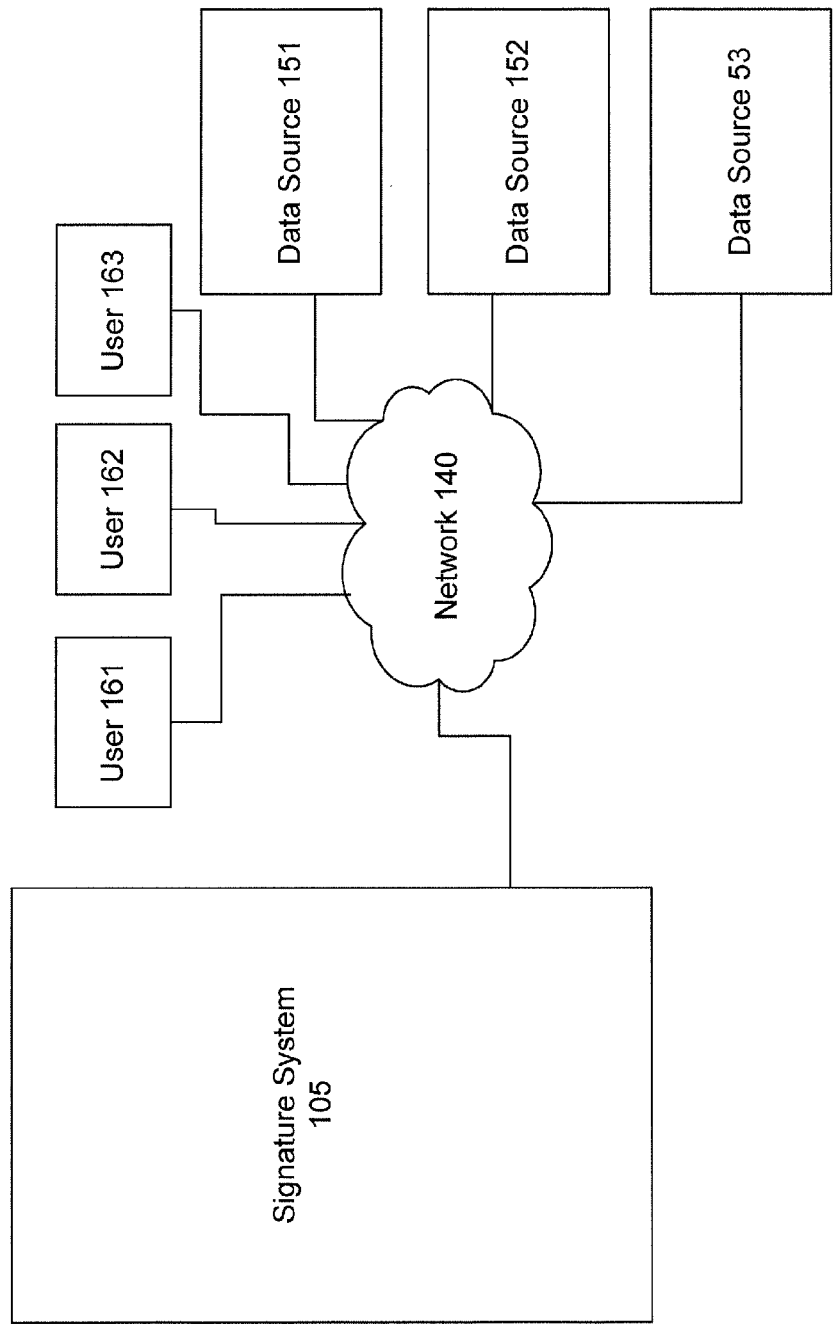
FIG. 1 is a block diagram depicting an exemplary system for creating and comparing signatures.

FIG. 1 is a block diagram depicting an exemplary system 100 for creating and comparing signatures. The system 100 may include user devices 161, 162, and 163, data sources 151, 152, and 153, network 140, and signature system 105.

One or more user devices 161, 162, and 163, may be coupled to the signature system 105 via the network 140 or some other coupling. User devices 161, 162, or 163 may be, for example, personal computers, personal data devices, telephones, tablet personal computers, mobile phones, or other devices coupled to identification system 105 via network 140. Additionally, in some embodiments (not shown) users may directly operate signature system 105 (e.g., the user's device may embody the signature system 105). While portions of the specification may only refer to one user device 161, 162, or 163, this is for simplification purposes only and, unless noted otherwise, is not meant to limit the described embodiments in any way.

Data sources 151, 152, and 153 may be any form of database, including a proprietary database containing information about one or more users. Data sources 151, 152, and 153 may be "blogs" or websites, such as social networking websites or news agency websites. Data sources 151, 152, and 153 may, for example, be private party websites, company websites, or cached information stored in a search database, such as those maintained at Google™ or Yahoo™. Data sources 151, 152, and 153 may, in alternative examples, be a criminal database or listing, a credit agency data source, an insurance database, facial recognition database, a fingerprint database, a DNA database, a retinal database, or any electronic or other source of information about any user. There may be any number of data sources 151, 152, and 153. While portions of the specification may only refer to only one data source 151, 152, and/or 153, this has been done for simplification purposes only and, unless noted otherwise, is not meant to limit the described embodiments in any way. Documents contained in the search database may relate to a person, organization, or other entity and may include web pages, emails, Microsoft Word™ documents, plain text files, encoded documents, or any other appropriate form of unstructured electronic information.

Network 140 may be, for example, the Internet, an intranet, a local area network, a wide area network, a campus area network, a metropolitan area network, an extranet, a private extranet, any set of two or more coupled electronic devices, or a combination of any of these or other appropriate networks.

Signature system 105 may include one or more processors (not shown), a memory (not shown), and a data interface (not shown). The processor(s) may be a single or multiple microprocessors, field programmable gate arrays (FPGAs), or digital signal processors (DSPs) capable of executing particular sets of instructions. Computer-readable instructions may be stored on a tangible non-transitory computer-readable medium, such as a flexible disk, a hard disk, a CD-ROM (compact disk-read only memory), and MO (magneto-optical), a DVD-ROM (digital versatile disk-read only memory), a DVD RAM (digital versatile disk-random access memory), or a semiconductor memory. Alternatively, the methods may be implemented in hardware components or combinations of hardware and software such as, for example, ASICs, special purpose computers, or general purpose computers. Signature system 105 may be implemented on a single computer, or may be distributed across a plurality of computers. Signature system 105 may be coupled to multiple data sources, for example, data sources 151, 152, and 153 either via network 140 or via other coupling.

Figure 2:
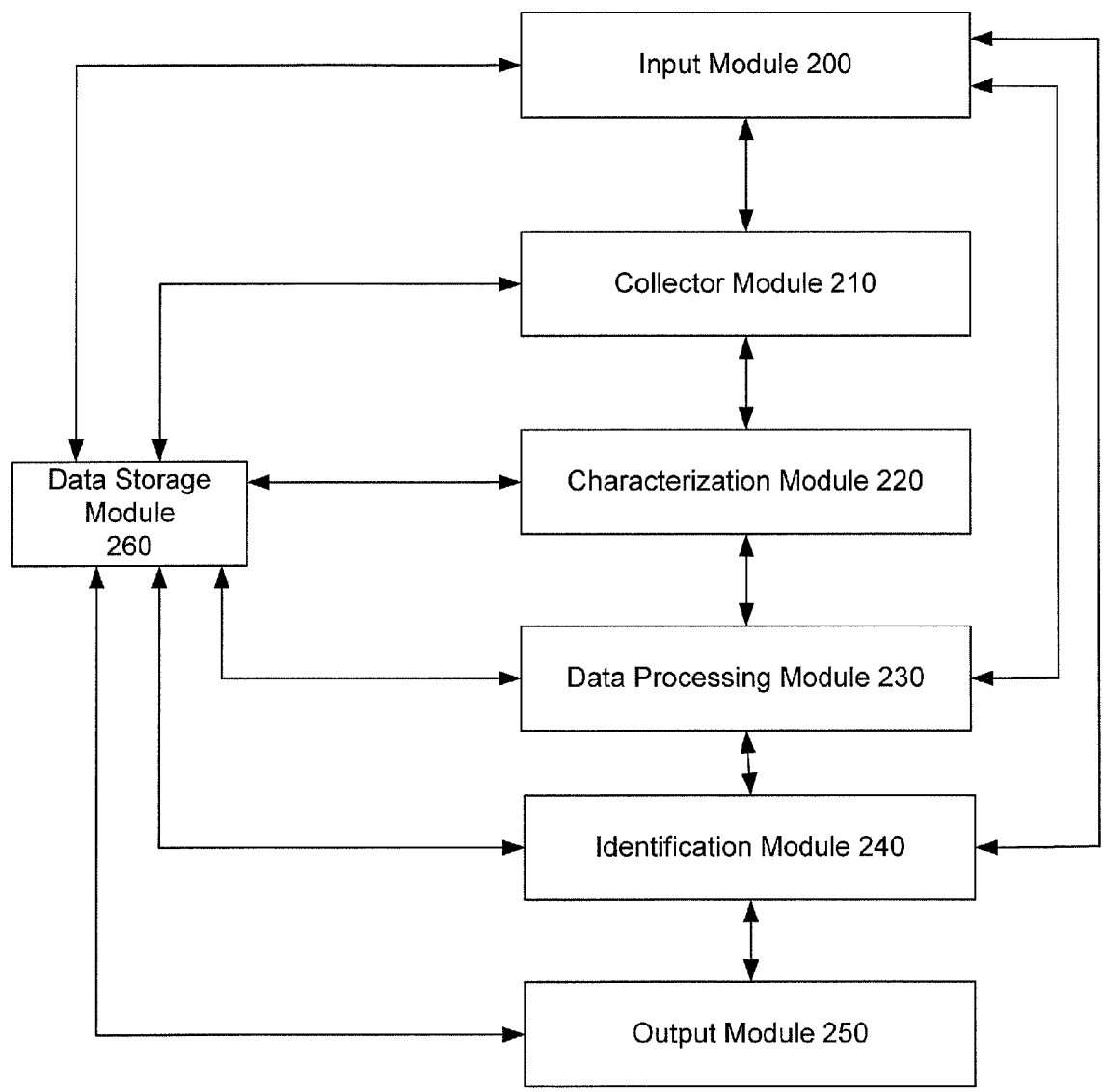
FIG. 2 is a block diagram depicting an exemplary signature system.

FIG. 2 is a block diagram depicting exemplary signature system 105. Signature system 105 may include an input module 200, a collector module 210, a characterization module 220, a data processing module 230, an identification module 240, an output module 250, and a data storage module 260.

Input module 200 is a hardware interface, a software program, or a combination thereof configured to obtain a set of data from a network, for example, data from one or more user devices 161-163 or one or more data sources 151-153. The data set may include, for example, text based information, image based information, or some combination thereof. Additionally, input module 200 may be configured to receive a data set from a user interfacing directly with signature system 105. Input module 200 can be configured to store the received information in data storage module 260. Input module 200 may be, for example, an Internet web server, such as Apache Tomcat™, Microsoft's Internet Information Services™, or Sun's Java System Web Server™. In some embodiments, input module 200 is combined with output module 270. Input module 200 may be coupled to one or more of collector module 210, data processing module 230, identification module 240, and data storage module 260.

Collector module 210 is a hardware component, a software program, or a combination thereof configured to formulate searches using the received information. Additionally, the collector module 210 may be configured to prepare queries to send to one or more data sources 151, 152, and 153. Collector module 210 may be configured to work with output module 250 for sending the queries to one or more data sources 151, 152, and 153. Collector module 210 may be configured to receive electronic information related to the target of the search from data sources 151, 152, and 153. Collector module 210 may be coupled to one or more of input module 200, characterization module 220, and data storage module 260.

Characterization module 220 is a hardware component, a software program, or a combination thereof configured to characterize the received data set creating one or more data matrices. For example, if the data set is text-based, characterization module 220 can break the stream of text up into tokens (e.g., each token representing a word, a phrase, or a symbol), which are used to populate a data matrix, such that each received document has its own associated data matrix. Similarly if the data set is image-based, characterization module 220 can break the images up into tokens (e.g., each token representing a numeric value associated with a characteristic of the image), which are used to populate a data matrix, such that each received image has its own associated data matrix. For example, fingerprints may be associated with a data matrix by looking at features associated with each finger. Fingerprints may contain specific patterns, such as whorls, arches, and loops. The presence of these features can be assigned a numeric value. The one or more data matrices may have the same dimensions, n×m.

Characterization module 220 can provide the one or more data matrices to data processing module 230. In some embodiments, characterization module 220 may provide the one or more data matrices to data storage module 260. Characterization module 220 may be coupled to one or more of collector module 210, data processing module 230, and data storage module 260.

Data processing module 230 is a hardware component, a software program, or a combination thereof configured to process the one or more data matrices, to determine a unique signature for each of the data matrices. Data processing module 230 may be configured to receive one or more data matrices from characterization module 220 or input module 200.

Data processing module 230 may be configured to determine the number of signatures to be calculated by signature system 105. In some embodiments, the number of signatures may be equal to or in excess of the total number of data matrices. In some embodiments, a user may input the number of desired signatures (e.g., via input module 200). Data processing module is configured to automatically determine a prime number, N, which is larger than the desired total number of signatures. Data processing module 230 is configured to automatically set N to a value greater than the number 3.

Data processing module 230 may be configured to determine a plurality of primitive roots of N. The process of determining primitive roots is discussed below with reference to FIG. 3. In this embodiment, data processing module is configured to select 'a' and 'b' values from the set of determined primitive roots. These processes and exemplary uses of primitive roots are discussed in detail below with reference to FIGS. 3 and 4.

Data processing module 230 may be configured to calculate a template matrix that has the same dimensions as the one or more data matrices, n×m. The elements of the template matrix are determined by the formula: $a^i b^j$, where a and b correspond to the primitive roots previously determined. The 'i' variable corresponds to the row position within the template matrix, and the 'j' variable corresponds to the column position within the template matrix. For example, for a 2×2 template matrix, where a=2 and b=3, the template matrix would equal [(6, 12), (18, 36)].

Data processing module 230 may be configured to characterize the one or more data matrices based on one or more properties of the received information. Properties may include: sparseness structures, positive numbers, negative numbers, repeated rows, repeated columns, irregular matrices, etc. For example, if the user is interested in creating signatures for sparseness structures, data processing module 230 may replace every non-zero entry in each data matrix with a '1,' such that the set of one or more data matrices only contains '1' and '0' values. These characterized matrices may then be applied to the template matrix to create a shadow matrix for each of the one or more data matrices. For example if the template matrix has a value of [(15, 45), (75, 225)], and a characterized data matrix has a value of [(1, 0), (0, 1)], the associated shadow matrix has a value of [(15, 0), (0, 225)]. In some embodiments, the shadow matrices are temporary and are not stored in persistent memory.

Data processing module 230 may be configured to calculate a signature for each data matrix using the hash function:

$$\left(\sum_{i,j} a^i b^j \text{Mod}(N), \text{ if } A_{ij} = \text{condition}\right) \text{Mod}(N)$$

The hash function is calculated for each of the data matrices, where $A_{ij}$ corresponds to the positional value within the data matrix being processed. The modifier, if $A_{ij}$=condition, modifies the hash function such that it creates signatures respective of a particular property of interest. Additionally, this function may be tailored for the particular property of interest. For example, if the property of interest is sparseness structures, the hash function becomes:

$$\left(\sum_{i,j} a^i b^j \text{Mod}(N), \text{ if } A_{ij} \neq 0\right) \text{Mod}(N)$$

where $A_{i,j}$ refers to elements within each data matrix that are not equal to zero. Data processing module 230 may be configured to store the calculated signatures in data storage module 260. The process of calculating the hash function is discussed in detail below with reference to FIGS. 3 and 4. If the set of calculated signatures has no collisions, it is referred to as the main signature set. Additionally, data processing module 230 may be configured to use the pre-computed values of the positional elements within the template matrix to solve for the $a^i b^j$ values. For large sets of data matrices, this may save a lot of system resources, as the values of $a^i b^j$ would not need to be recomputed each time the hash function operates on a new data matrix.

Data processing module 230 may be configured to detect collisions in the calculated signatures. A collision occurs when, of the set of signatures, two or more signatures have the same value. Data processing module 230 may be configured to select new values from a and b, recalculate the template matrix with the new a and b values, re-calculate the signatures using the hash function, and then determine if any additional collisions occur. Additionally, data processing module 230 may be configured to choose a larger prime number (than the original N value) as N if collisions continue to occur. In some embodiments, data processing module 230 may be configured to select the new a and b values from the plurality of primitive roots previously selected.

In some embodiments, data processing module 230 may be configured to re-calculate the signatures for all the data matrices, using the new a and b values. In some embodiments, data processing module 230 may be configured to only re-calculate the signatures with the new a and b values for only the data matrices where the collision originally occurred.

Additionally, in some embodiments not shown, data processing module 230 may be coupled to one or more slave servers, where each slave server maintains a portion of the one or more data matrices. Data processing module may be coupled to one or more of input module 200, characterization module 220, identification module 240, and data processing module 240.

Identification module 240 is a hardware component, a software program, or a combination thereof configured to compare one or more signatures to the signatures associated with the main set of signatures to determine if a match occurs. Identification module 240 may be configured to receive one or more signatures from data processing module 230, input module 200, output module 250, and data storage module 260.

Output module 250 may also be configured to transmit data, via network 140, from identification module 240, data storage module 260, or some combination thereof, to one or more user devices 161, 162, and 163. In some embodiments, output module 250 acquires the one or more signatures associated with the one or more data matrices from data storage module 260 and provides them to one or more user devices 161, 162, and 163. Additionally, in some embodiments, output module 250 acquires any match information from identification module 240. This information may be displayed to the user through the user's access device. In some embodiments output module 260 may display the results to a human operator who may modify, correct, or alter the information, or to any other system or agent capable of interacting with the information, including an artificial intelligence system or agent (AI agent), before sending it to the user.

Additionally, output module 250 may be configured to provide the main set of signatures, the one or more data matrices, or a combination thereof, to one or more user devices 161, 162, and 163. Output module 250 may be coupled to one or more of identification module 240 and data storage module 260.

Data storage module 260 may comprise a random access memory (RAM), a read only memory (ROM), a programmable read-only memory (PROM), a field programmable read-only memory (FPROM), or other dynamic storage device for storing information and instructions to be used by input module 200, collector module 210, characterization module 220, data processing module 230, identification module 240, and output module 250. For example, data storage module 260 may store data received by input module 200. Data storage module 260 may also include a database, one or more computer files in a directory structure, or any other appropriate data storage mechanism such as a memory. In some embodiments, data storage module 260 is distributed across a plurality of different data storage mechanisms.

The coupling between modules, or between modules and network 140, may include, but is not limited to, electronic connections, coaxial cables, copper wire, and fiber optics, including the wires that comprise network 140. The coupling may also take the form of acoustic or light waves, such as lasers and those generated during radio-wave and infra-red data communications. Coupling may also be accomplished by communicating control information or data through one or more networks to other data devices. In some embodiments input module 200, collector module 210, characterization module 220, data processing module 230, identification module 240, output module 250, and data storage module 260 may be coupled in a manner such that each module is logically connected to all of the other modules in information system 105.

Each of the logical or functional modules described above may comprise multiple modules. The modules may be implemented individually or their functions may be combined with the functions of other modules. Further, each of the modules may be implemented on individual components, or the modules may be implemented as a combination of components. For example, input module 200, collector module 210, characterization module 220, data processing module 230, identification module 240, and output module 250 may each be implemented by a field-programmable gate array (FPGA), an application-specific integrated circuit (ASIC), a complex programmable logic device (CPLD), a printed circuit board (PCB), a combination of programmable logic components and programmable interconnects, single CPU chip, a CPU chip combined on a motherboard, a general purpose computer, or any other combination of devices or modules capable of performing the tasks of modules 200, 210, 220, 230, 240, 250, and 260.

Figure 3:
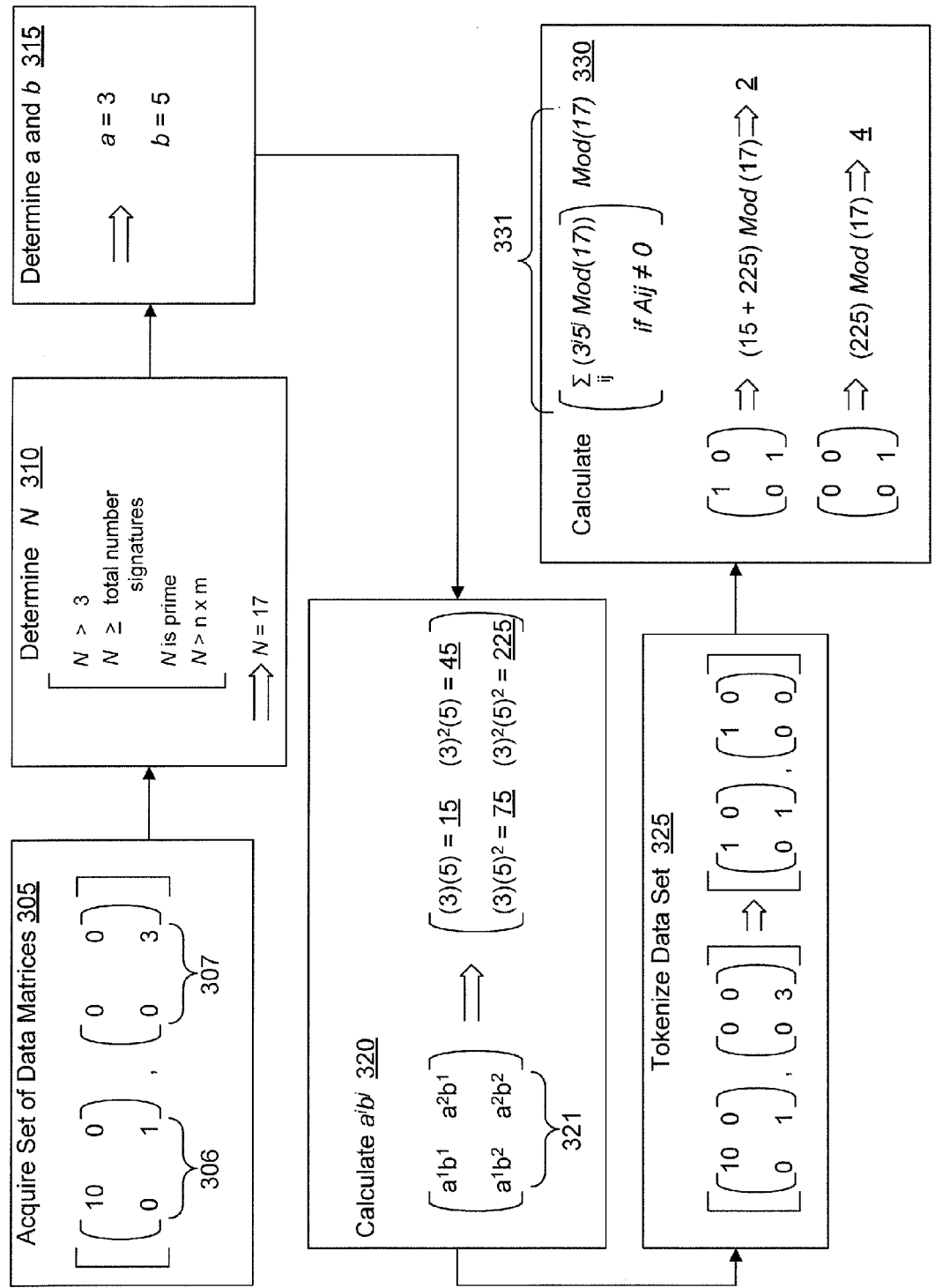
FIG. 3 is an exemplary application of the system depicted in FIG. 1.

FIG. 3 is an exemplary application of the system depicted in FIG. 1. The user may be, for example, attempting to create a signature for the sparseness structures associate with a set of data matrices. In step 305, the signature system 105 may acquire the set of data matrices. In this example, the set of data matrices includes data matrix 306 and data matrix 307.

In step 310, the signature system 105 determines a prime number N. The N value is also greater than 3, greater than the n×m, and greater than or equal to the total number of signatures. In this example, signature system 105 sets N at 17. In step 315, signature system 105 determines primitive roots a and b. A primitive root is any number g with the property that any number coprime (relative prime) to N is congruent to a power of g modulo N. That is, for every integer a coprime to n, there is an integer k such that $g^k \equiv a \pmod{n}$. For example, the primitive roots of 17 are 3, 5, 6, 7, 10, 11, 12, 14. In step 315, signature system 105 automatically determines a plurality of primitive roots of N. In some embodiments, signature system 105 may calculate all of the primitive roots for N. Signature system 105 selects a and b from the calculated primitive roots. In this example, signature system 105 selects 3 and 5 as the values for a and b, respectively. In some embodiments, a and b may simply be prime numbers and not primitive roots.

In step 320, signature system 105 calculates a template matrix 321. Template matrix 321 has the same dimensions as the data matrices. In this example, the dimensions of each data matrix is 2×2, thus, template matrix 321 has the same dimensions. The positional values within template matrix 321 correspond to the value $a^i b^j$, where a and b correspond to the primitive roots previously determined (e.g., 3 and 5, respectively). The 'i' variable corresponds to the row position within template matrix 321, and the 'j' variable corresponds to the column position within template matrix 321. For example, for a 2×2 template matrix, where a=3 and b=5, the template matrix would equal [(15, 45), (75, 225)].

In step 325, signature system 105 characterizes the set of data matrices based on one or more properties of the received information. Properties may include: sparseness structures, positive numbers, negative numbers, repeated rows, repeated columns, irregular matrices, etc. In this example, the property of interest is sparseness structures, accordingly the signature system 105 may replace every non-zero entry in data matrix 306 and data matrix 307 with a '1,' such that the set of data matrices only contains '1' and '0' values. The characterized matrices may then be applied to the template matrix to create a shadow matrix for each of the one or more data matrices. For example if the template matrix has a value of [(15, 45), (75, 225)], and a characterized data matrix has a value of [(1, 0), (0, 1)], the associated shadow matrix has a value of [(15, 0), (0, 225)]. In some embodiments, the shadow matrices are temporary and are not stored in persistent memory. In some embodiments, signature system 105 may omit the characterization step.

In step 330, signature system 105 calculates a hash function 331:

$$\left(\sum_{i,j} 3^i 5^j \text{Mod}(17), \text{ if } A_{ij} \neq 0\right) \text{Mod}(17)$$

where $A_{ij}$ corresponds to the positional value within the data matrix being processed. Signature system 105 uses the pre-computed values of the positional elements within the template matrix to solve for $3^i 5^j$ values. For large sets of data matrices, this may save a lot of system resources, as the values of $a^i b^j$ would not need to be recomputed each time the hash function operates on a new data matrix. The calculated signatures for data matrices 306 and 307 are 2 and 4, respectively. Additionally, in some embodiments, signature system 105 uses the one or more shadow matrices to calculate the signatures for each of their associated data matrices. These results may then be provided to the user. Detailed embodiments of the process discussed above are described with respect to FIGS. 4 and 5.

Figure 4:
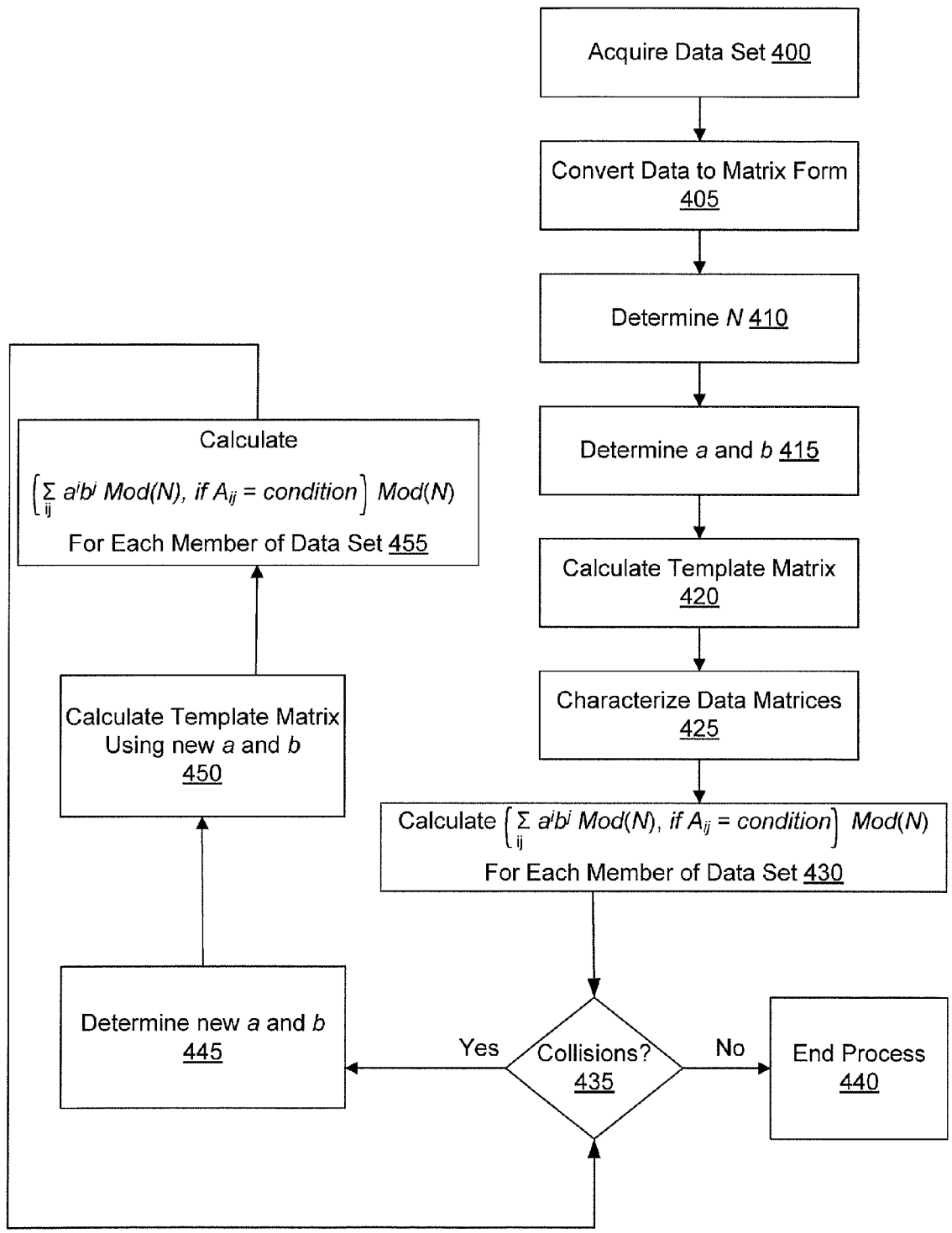
FIG. 4 is a flowchart representing an exemplary method for calculating signatures for one or more data matrices using a signature system.

FIG. 4 is a flowchart representing an exemplary method for calculating signatures for one or more data matrices. In step 400, a data set is acquired. The data set may include, for example, text based information, image based information, or some combination thereof. In some embodiments, the data set may be received from a user (not shown) interfacing directly with a server (e.g., signature system 105). In some embodiments, the data set is obtained from one or more memory locations (e.g., data storage module 260).

Additionally, in some embodiments, information is received from the user and the information is used to formulate searches to obtain the data set. In some embodiments, a set of search terms may be received from the user or through web crawling or spidering. In some embodiments, the server selects which data sources will be queried in the search process. For example, the server can select categories where the search may be performed, e.g., private party websites, company websites, cached information stored in a search database (such as those maintained at Google™ or Yahoo™), criminal databases, a credit agency data source, an insurance database, etc. The query may be submitted as Hypertext Transfer Protocol (HTTP) POST or GET mechanism, hypertext markup language (HTML), extensible markup language (XML), structured query language (SQL), plain text, Google Base, as terms structured with Boolean operators, or in any appropriate format using any appropriate query or natural language interface. The query may be submitted via the Internet, an intranet, or via any other appropriate coupling to a query processing engine associated with or contained within any of the data sources. The searches may be performed via "screen scraping" on a publicly available search engine, such as Google search or Yahoo search, or private search engines, such as Westlaw search or LexisNexis search. Searches may also be performed via a searching application program interface (API) or structured data exchange (such as eXtensible Markup Language).

In step 405, the obtained data is converted into one or more matrices. If the obtained data set is text based, the stream of text is broken up into tokens (e.g., each token representing a word, a phrase, or a symbol), which may be used to populate a data matrix, such that each received document has its own associated data matrix. Similarly if the data set is image based, the images may be broken up into tokens (e.g., each token representing a characteristic of the image), which are used to populate a data matrix, such that each received image has its own associated data matrix. For example, fingerprints may be associated with a data matrix by looking at features associated with each finger. Fingerprints may contain specific patterns, e.g., whorls, arches, and loops. The presence of these features can then be assigned a numeric value. The one or more data matrices may have the same dimensions, n×m.

Figure 5:
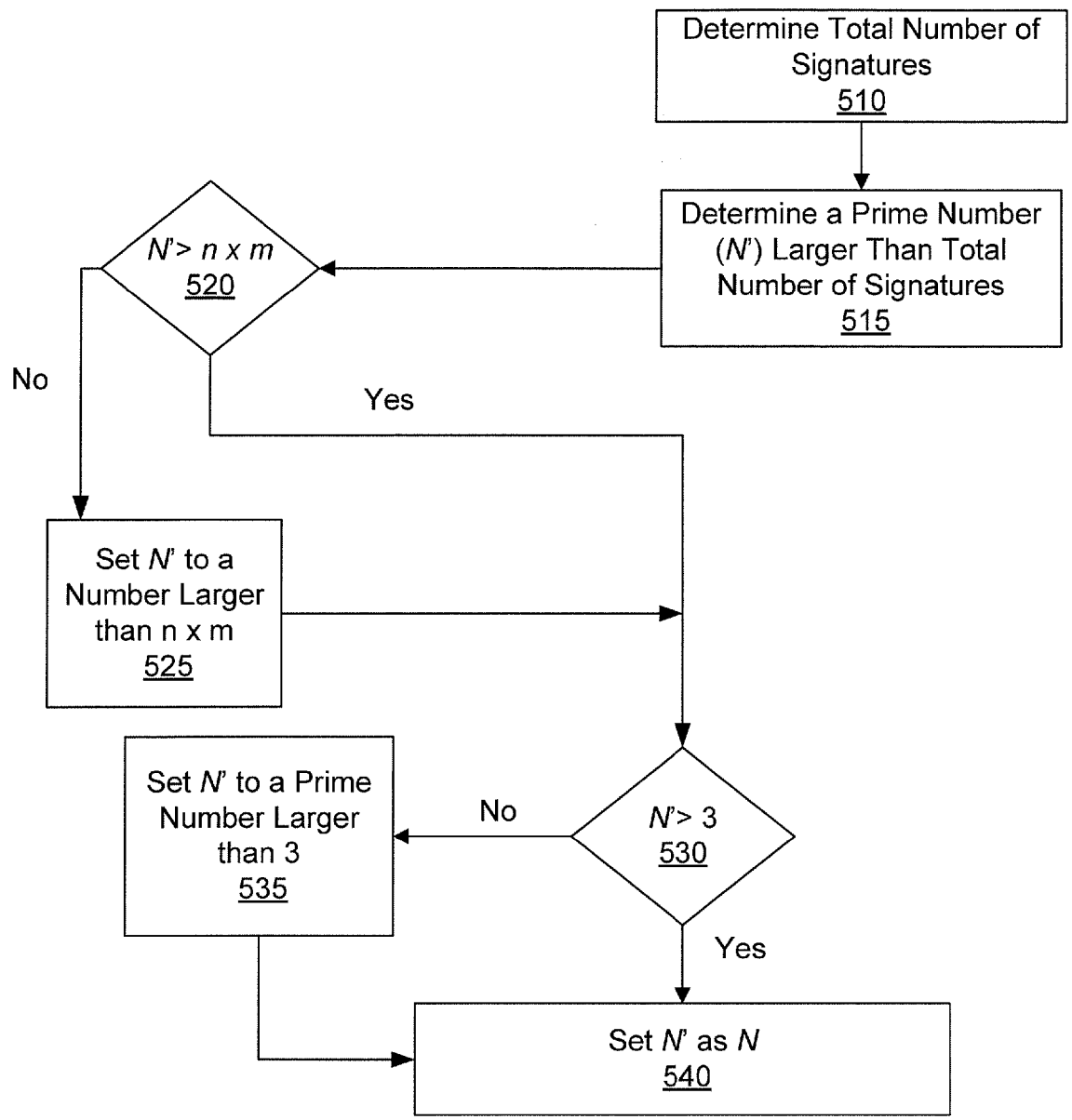
FIG. 5 is a flowchart representing a detailed method for determining a prime number, N.

In step 410, a prime number N is determined. FIG. 5 is a flowchart representing a detailed method for determining N. The value of N meets at least the following four criteria: (1) N≥total number of signatures; (2) N>3; (3) N≥n×m; and (4) N≥total number of signatures. In step 510, the total number of signatures is determined. For example, if a user is trying to establish a unique signature, based on a thumbprint, for 100 people. The total number of signature should be at least 100, one signature for every person.

In step 515, a prime number that is larger than the total number of signatures is determined. For example if the total number of signatures is 100, potential values for N include 101, 103, etc. The potential value of N is selected and designated as N'. In step 520, it is determined whether N' is greater than the dimensions of the data matrix, n×m. For example, if each data matrix is a 2×2 matrix, then N' must be larger than 4. If N'<n×m, a new N' that is greater than n×m (step 530) is automatically selected. If N'>n×m, then a determination is automatically made whether N' is greater than 3 (step 530). If N'>3, the N' value is selected for N (step 540). If N'<3, a prime number larger than 3 is automatically selected as the value for N' (step 535). Then the new N' value is selected as the N value (step 540).

Referring back to FIG. 4, in step 415 primitive roots a and b are determined. A primitive root is any number g with the property that any number coprime (relative prime) to N is congruent to a power of g modulo N. That is, for every integer a coprime to n, there is an integer k such that $g^k \equiv a \pmod{n}$. For example, the primitive roots of 17 are 3, 5, 6, 7, 10, 11, 12, 14. In step 415, a plurality of primitive roots of N are automatically determined. In some embodiments, all of the primitive roots for N are calculated. The a and b values are selected from the calculated primitive roots. In some embodiments, a and b may simply be distinct prime numbers and not primitive roots.

In step 420, a template matrix that has the same dimensions as the one or more data matrices, n×m, is calculated. The elements of the template matrix are determined by the formula: $a^i b^j$, where a and b correspond to the primitive roots previously determined. The 'i' variable corresponds to the row position within the template matrix, and the 'j' variable corresponds to the column position within the template matrix. For example, for a 2×2 template matrix, where a=2 and b=3, the template matrix would equal [(6, 12), (18, 36)], assuming all non-zero entries.

In step 425, the set of data matrices are characterized based on one or more properties of the received information. Properties may include: sparseness structures, positive numbers, negative numbers, repeated rows, repeated columns, irregular matrices, etc. For example, if the property of interest is sparseness structures, every non-zero entry in the one or more data matrices can be replaced with a '1,' such that the set of data matrices only contains '1' and '0' values. Similarly, if the property of interest were positive numbers, every positive number in the one or more data matrices can be replaced with a '1,' and any negative with a '0' values. In some embodiments (not shown), the characterization step may be omitted. The characterized matrices may then be applied to the template matrix to create a shadow matrix for each of the one or more data matrices. For example if the template matrix has a value of [(15, 45), (75, 225)], and a characterized data matrix has a value of [(1, 0), (0, 1)], the associated shadow matrix has a value of [(15, 0), (0, 225)]. In some embodiments, the shadow matrices are temporary and are not stored in persistent memory.

In step 430, a hash function is calculated. A general form of the hash function is:

$$\left(\sum_{i,j} a^i b^j \text{Mod}(N), \text{ if } A_{ij} = \text{condition}\right)\text{Mod}(N)$$

The hash function is calculated for each of the data matrices, where $A_{ij}$ corresponds to the positional value within the data matrix being processed. The modifier, if $A_{ij}$=condition, modifies the hash function such that it creates signatures respective of the particular property of interest. For example, if the user is interested in sparseness structures, the condition may read "if $A_{ij} \neq 0$." In some embodiments, the pre-computed values of the positional elements within the template matrix are used to solve for $a^i b^j$ values. For large sets of data matrices, this may save a lot of system resources, as the values of $a^i b^j$ would not need to be recomputed each time the hash function operates on a new data matrix. Additionally, in some embodiments, the one or more shadow matrices are used to calculate the signatures for each of their associated data matrices.

In step 435, it is determined if any collisions have occurred between the calculated set of signatures. A collision occurs when of the set of signatures, two or more signatures have the same value. If no collision occurs, then a unique signature has been created for each of the data matrices in the one or more data matrices, the set of signatures is referred to as a main set of signatures, and the process ends (440). If a collision occurs, in step 445, new values for a and b may be selected. The new values of a and b may be selected from the set of primitive roots of N previously determined. In some embodiments, a and b may be prime numbers and not primitive roots of N. For example, referring to FIG. 3, the number 2, is a prime number, but is not a primitive root of 17.

In step 450, a template matrix is calculated using the new a and b values. In step 455, the signatures for all the data matrices are re-calculated using the new a and b values. In some embodiments, the signatures are re-calculated with the new a and b values for only the data matrices where the collision originally occurred. In step 435, it is determined whether a collision occurs. If no collision occurs, then a unique signature has been created for each of the data matrices in the one or more data matrices, as noted previously the set of signatures is referred to as the main set of signatures, and the process ends (440). If a collision occurs again, the method may repeat steps 435, 445, 450, and 455 until a unique set of signatures is determined.

Figure 6:
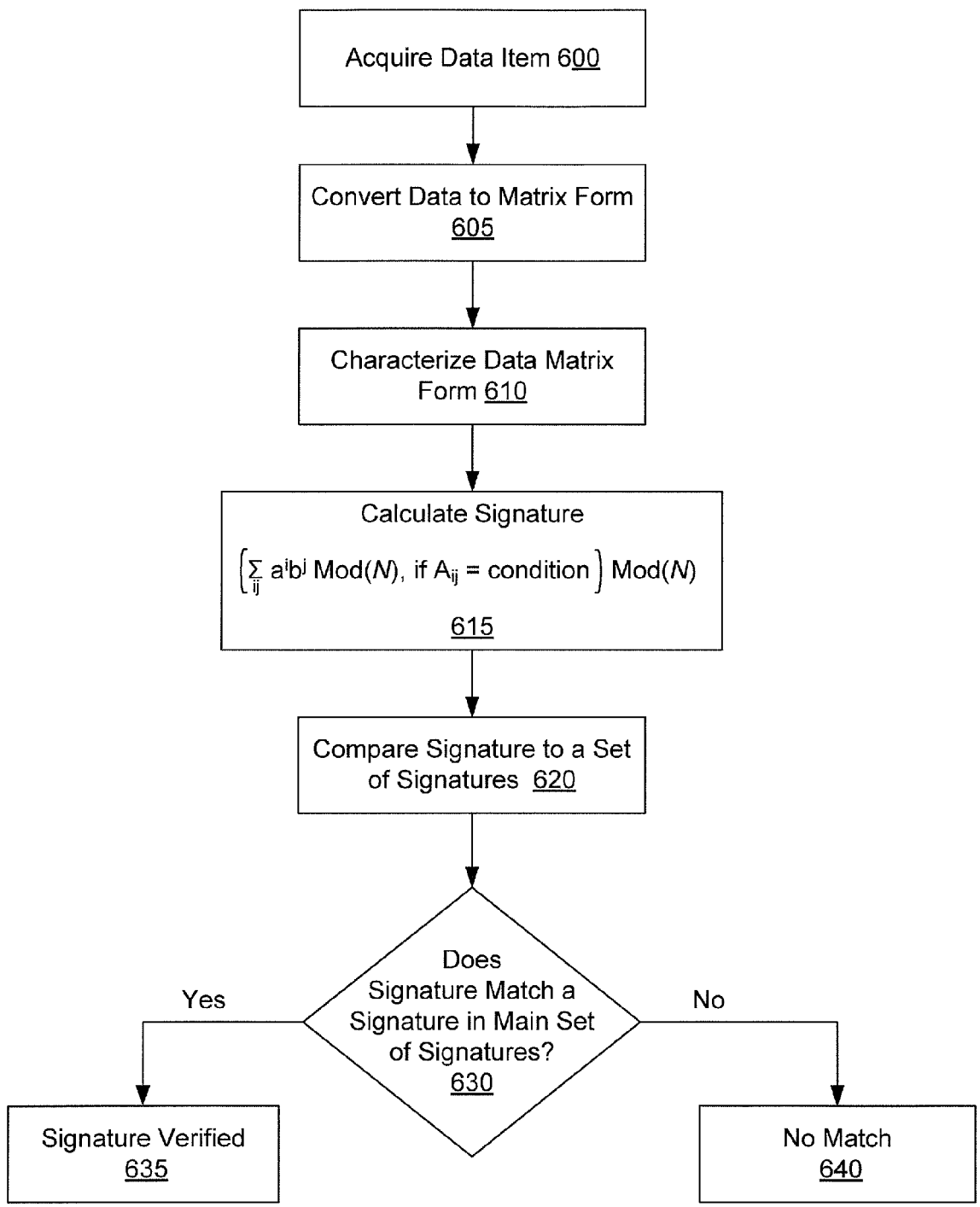
FIG. 6 is a flowchart representing an exemplary method for authenticating a signature.

FIG. 6 is a flowchart representing an exemplary method for authenticating a signature. In step 600, one or more data items are acquired. The one or more data items are to be verified against a plurality of signatures (i.e. main signature set) associated with a main set of data. The one or more data items may be received from a user interfacing directly with a server, for example signature system 105. In some embodiments, the data item is obtained from one or more memory locations (e.g., data storage module 260).

In step 605, the obtained one or more data items are converted into one or more data matrices, such that each data item has a corresponding data matrix. If the obtained data set is text based, the stream of text may be broken up into tokens (e.g., each token representing a word, a phrase, or a symbol), which may be used to populate a data matrix, such that each received document has its own associated data matrix. Similarly if the data set is image based, the images may be broken up into tokens (e.g., each token representing a characteristic of the image), which are used to populate a data matrix, such that each received image has its own associated data matrix. The one or more data matrices may have the same dimensions, n×m.

In step 610, the one or more data matrices are characterized based on one or more properties used to generate the signatures of the main data set. Properties may include: sparseness structures, positive numbers, negative numbers, repeated rows, repeated columns, irregular matrices, etc. For example, if signatures in the main signature set were created for the main data set based on sparseness structures, then the one or more data matrices would be characterized in a similar fashion, e.g., setting all non-zero elements to 1.

In step 615, a hash function is calculated for each of the one or more data matrices to be verified. A general form of the hash function is:

$$\left(\sum_{i,j} a^i b^j \text{Mod}(N), \text{ if } A_{ij} = \text{condition}\right)\text{Mod}(N)$$

where $A_{ij}$ corresponds to the positional value within the data matrix being processed. The modifier, if $A_{ij}$=condition, modifies the hash function such that it creates signatures respective of the particular property of interest. The a and b correspond to the primitive roots previously used, when calculating the main signature set. N corresponds to the prime number previously used when the main signature set was calculated. The template matrix corresponds to the template matrix used when determining the main signature set. The 'i' variable corresponds to the row position within the template matrix, and the 'j' variable corresponds to the column position within the template matrix. The template matrix has the same dimensions as the one or more data matrices to be verified, n×m. The elements of the template matrix are determined by the formula: $a^i b^j$. In some embodiments, the template matrix is temporary and is not stored in persistent memory.

In step 620, the one or more signatures to be verified are compared against the main set of signatures. If a signature to be verified matches a signature from the main set of signatures, the signature is verified (step 635). In contrast, if a signature to be verified does not match a signature from the main set of signatures, no match occurs (step 640.

Other embodiments of the claimed inventions will be apparent to those skilled in the art from consideration of the specification and practice of the inventions disclosed herein. It is intended that the specification and examples be considered as exemplary only, with a true scope and spirit of the inventions being indicated by the following claims.

The invention claimed is:

1. A method for generating one or more digital signatures, the method performed by a system comprising one or more processors and a memory storing instructions which, when executed cause the system to perform the method, the method comprising:
acquiring a data set;
converting the data set into a plurality of data matrices;
acquiring a user input including a total number of signatures;
determining a prime number, wherein the prime number is greater than the product of the dimensions of one matrix of the plurality of data matrices and is greater than the total number of signatures;
determining a plurality of primitive roots to the prime number;
calculating a first template matrix using a first and second primitive root, of the plurality of primitive roots;
selecting a data matrix property of interest;
calculating a first hash function for each of the data matrices, wherein the first hash function is calculated using said property of interest, the prime number, and the first template matrix; and
generating a main set of signatures based on the first hash function, wherein the main set of signatures comprises a first signature for each data matrix, and wherein the number of signatures in the main set of signatures equals the total number of signatures.

2. The method of claim 1, wherein the property of interest is sparseness structure.

3. The method of claim 1, wherein the first hash function is calculated using for the property of interest $(\Sigma_{i,j} a^i b^j \text{Mod}(N), \text{if } A_{i,j}=\text{condition})\text{Mod}(N)$, wherein condition corresponds to the property of interest, N corresponds to the prime number, and $a^i b^j$ corresponds to entries in the first template matrix.

4. The method of claim 1, wherein the data set corresponds to graphical information.

5. The method of claim 1, further comprising:
determining if two or more first signatures have equal value.

6. The method of claim 5, further comprising:
selecting a third and a fourth primitive root from the plurality of primitive roots;
calculating a second template matrix using the third and fourth primitive roots;
calculating a second hash function for each of the data matrices to create a second signature for each data matrix, wherein the second hash function is calculated using the property of interest, the prime number, and the second template matrix; and
determining if two or more second signatures are equal.

7. The method of claim 6, wherein the second hash function is calculated using for the property of interest $(\Sigma_{i,j} a'^i b'^j \text{Mod}(N), \text{if } A_{i,j}=\text{condition})\text{Mod}(N)$, wherein condition corresponds to the property of interest, N corresponds to the prime number, and $a'^i b'^j$ corresponds to entries in the second template matrix.

8. The method of claim 1, further comprising:
acquiring a data item;
converting the data item to data matrix form;
calculating a third hash function for the data matrix to create a third signature, wherein the third hash function is calculated using the property of interest, the prime number, and the a third template matrix; and
comparing the third signature against the main set of signatures.

9. A non-transitory computer-readable medium that stores a set of instructions that are executable by at least one processor of a computer system to cause the computer system to perform a method comprising:
acquiring a data set;
converting the data set into a plurality of data matrices;
acquiring a user input including a total number of signatures;
determining a prime number, wherein the prime number is greater than the product of the dimensions of one matrix of the plurality of data matrices and is greater than the total number of signatures;
determining a plurality of primitive roots to the prime number;
calculating a first template matrix using a first and second primitive root, of the plurality of primitive roots;
selecting a data matrix property of interest;
calculating a first hash function for each of the data matrices, wherein the first hash function is calculated using said property of interest, the prime number, and the first template matrix; and
generating a main set of signatures based on the first hash function, wherein the main set of signatures comprises a first signature for each data matrix, and wherein the number of signatures in the main set of signatures equals the total number of signatures.

10. The computer readable medium of claim 9, wherein the property of interest is sparseness structure.

11. The computer readable medium of claim 9, wherein the first hash function is calculated using for the property of interest $(\Sigma_{i,j} a^i b^j \text{Mod}(N), \text{if } A_{i,j}=\text{condition})\text{Mod}(N)$, wherein condition corresponds to the property of interest, N corresponds to the prime number and $a^i b^j$ corresponds to entries in the first template matrix.

12. The computer readable medium of claim 9, wherein the data set corresponds to graphical information.

13. The computer readable medium of claim 9, wherein the set of instructions that are executable by the at least one processor of the computer system to cause the computer system to further perform further comprising:
determining if two or more first signatures have equal value.

14. The computer readable medium of claim 13, wherein the set of instructions that are executable by the at least one processor of the computer system to cause the computer system to further perform further comprising:
selecting a third and a fourth primitive root from the plurality of primitive roots;
calculating a second template matrix using the third and fourth primitive roots;
calculating a second hash function for each of the data matrices to create a second signature for each data matrix, wherein the second hash function is calculated using the property of interest, the prime number, and the second template matrix; and
determining if two or more second signatures are equal.

15. The computer readable medium of claim 14, wherein the second hash function is calculated using for the property of interest $(\Sigma_{i,j} a^{i'} b^{i'} \text{Mod}(N), \text{if } A_{i,j}=\text{condition})\text{Mod}(N)$, wherein condition corresponds to the property of interest, N corresponds to the prime number, and $a^{i'} b^{i'}$ corresponds to entries in the second template matrix.

16. The computer readable medium of claim 9, wherein the set of instructions that are executable by the at least one processor of the computer system to cause the computer system to further perform further comprising:
   acquiring a data item;
   converting the data item to data matrix form;
   calculating a third hash function for the data matrix to create a third signature, wherein the third hash function is calculated using the property of interest, the prime number, and the a third template matrix; and
   comparing the third signature against the main set of signatures.

17. A system comprising:
   one or more processors configured to execute one or more modules; and
   a memory storing the one or more modules, the modules comprising:
   an input module configured to acquire a data set;
   a characterization module configured to convert the data set into a plurality of data matrices;
   a data processing module configured to:
   acquire a user input including a total number of signatures;
   determine a prime number, wherein the prime number is greater than the product of the dimensions of one data matrix of the plurality of data matrices and is greater than the total number of signatures;
   determine a plurality of primitive roots to the prime number;
   calculate a first template matrix using a first and second primitive root, of the plurality of primitive roots;
   select a data matrix property of interest; and
   calculate a first hash function for each of the data matrices, wherein the first hash function is calculated using said property of interest, the prime number, and the first template matrix; and
   generate a main set of signatures based on the first hash function, wherein the main set of signatures comprises a first signature for each data matrix, and wherein the number of signatures in the main set of signatures equals the total number of signatures.

18. The system of claim 17, wherein the property of interest is sparseness structure.

19. The system of claim 17, wherein the first hash function is calculated using for the property of interest $(\Sigma_{i,j} a^i b^j \text{Mod}(N), \text{if } A_{i,j}=\text{condition})\text{Mod}(N)$, wherein condition correspponds to the property of interest, N corresponds to the prime number, and $a^i b^j$ corresponds to entries in the first template matrix.

20. The system of claim 17, wherein the data set corresponds to graphical information.

21. The system of claim 17, wherein the data processing module is further configured to determine if two or more first signatures have equal value.

22. The system of claim 21, further comprising:
   selecting a third and a fourth primitive root from the plurality of primitive roots;
   calculating a second template matrix using the third and fourth primitive roots; and
   calculating a second hash function for each of the data matrices to create a second signature for each data matrix, wherein the second hash function is calculated using the property of interest, the prime number, and the second template matrix; and
   determining if two or more second signatures are equal.

23. The system of claim 17, wherein the second hash function is calculated using for the property of interest $(\Sigma_{i,j} a^{i'} b^{i'} \text{Mod}(N), \text{if } A_{i,j}=\text{condition})\text{Mod}(N)$, if condition corresponds to the property of interest, N corresponds to the prime number, and $a^{i'} b^{i'}$ corresponds to entries the second template matrix.

24. The system of claim 17, wherein:
   the input module is further configured to acquire a data item;
   the characterization module is further configured to convert the data item to data matrix form;
   the data processing module is further configured to calculate a third hash function for the data matrix to create a third signature, wherein the third hash function is calculated using the property of interest, the prime number, and the a third template matrix; and
   an identification module is configured to compare the third signature against the main set of signatures.

* * * * *